United States Patent
Yamanoi et al.

(10) Patent No.: US 9,120,139 B2
(45) Date of Patent: Sep. 1, 2015

(54) METHOD OF AND A DEVICE FOR FORMING A PROJECTION ON A METAL MEMBER AND A METAL PART PROCESSED BY THE METHOD OF FORMING A PROJECTION

(75) Inventors: Syuichi Yamanoi, Tsukubamirai (JP);
Yoshinobu Motohashi, Hitachi (JP);
Eitaro Yukutake, Mito (JP)

(73) Assignee: Yamanoiseiki Co., Ltd., Ibaraki (JP)

( * ) Notice: Subject to any disclaimer, the term of this patent is extended or adjusted under 35 U.S.C. 154(b) by 0 days.

(21) Appl. No.: 12/498,596

(22) Filed: Jul. 7, 2009

(65) Prior Publication Data

US 2010/0015465 A1 Jan. 21, 2010

(30) Foreign Application Priority Data

Jul. 15, 2008 (JP) .................................. 2008-183276

(51) Int. Cl.
*B23K 20/12* (2006.01)
*B21J 5/06* (2006.01)
*B21J 5/12* (2006.01)
*B21K 23/00* (2006.01)

(52) U.S. Cl.
CPC .. *B21J 5/063* (2013.01); *B21J 5/12* (2013.01); *B21K 23/00* (2013.01); *B23K 20/126* (2013.01); *B23K 20/127* (2013.01); *B23K 20/129* (2013.01); *B23K 2203/08* (2013.01); *Y10T 29/49826* (2015.01); *Y10T 29/53* (2015.01); *Y10T 428/12375* (2015.01)

(58) Field of Classification Search
None
See application file for complete search history.

(56) References Cited

U.S. PATENT DOCUMENTS

| | | | | | |
|---|---|---|---|---|---|
| 2,434,737 | A | * | 1/1948 | Enghauser | 228/2.3 |
| 2,524,420 | A | * | 10/1950 | Blampin | 72/95 |
| 2,779,998 | A | * | 2/1957 | Bailey | 228/114 |
| 2,906,005 | A | * | 9/1959 | Harris | 29/898.07 |
| 2,942,748 | A | * | 6/1960 | Anderson | 156/72 |
| 3,269,003 | A | * | 8/1966 | Hollander et al. | 228/114.5 |
| 3,417,457 | A | * | 12/1968 | Burke et al. | 228/114.5 |
| 3,580,793 | A | * | 5/1971 | Hewitt | 156/579 |
| 3,705,678 | A | * | 12/1972 | Searle | 228/2.1 |
| 3,934,327 | A | * | 1/1976 | Hafner | 29/432 |

(Continued)

FOREIGN PATENT DOCUMENTS

| | | | |
|---|---|---|---|
| DE | 3307445 A | * | 9/1984 |
| JP | 59-127982 A | * | 7/1984 |

(Continued)

OTHER PUBLICATIONS

Machine translation of JP-2002-066760A (no date available).*

(Continued)

*Primary Examiner* — Kiley Stoner
(74) *Attorney, Agent, or Firm* — Brundidge & Stanger, P.C.

(57) ABSTRACT

The present invention provides a method of forming a solid projection having excellent mechanical properties on a metal member without supplying thermal energy from the outside, and a projection-forming device and a metal part having a projection manufactured thereby. The means for solving the problems is characterized in that the means is comprised of the processes of pressing the distal end 13a of the processing jig 13 having the hole-opening and a cavity 13b at the distal end against the surface of the metal member workpiece 111 and rotating the metal member workpiece 111 and the processing jig 13 in the direction relatively counter to the other to generate friction heat causing thereby plastic flow into the cavity through the hole-opening 13b.

6 Claims, 10 Drawing Sheets

(56) References Cited

U.S. PATENT DOCUMENTS

| | | | |
|---|---|---|---|
| 3,981,064 A * | 9/1976 | Hafner | 29/432 |
| 3,993,519 A * | 11/1976 | Birkhold | 156/73.5 |
| 4,555,838 A * | 12/1985 | Muller | 29/432.1 |
| 4,729,163 A * | 3/1988 | Muller et al. | 29/798 |
| 5,099,672 A * | 3/1992 | Steinhauser et al. | 72/345 |
| 5,469,617 A * | 11/1995 | Thomas et al. | 29/889.21 |
| 5,626,047 A * | 5/1997 | Bello | 72/273 |
| 6,153,035 A * | 11/2000 | Van Laeken | 156/73.5 |
| 6,238,121 B1 | 5/2001 | Roser | 403/13 |
| 6,314,633 B1 * | 11/2001 | Norkus et al. | 29/448 |
| 6,374,490 B1 * | 4/2002 | Miyahara | 29/890.03 |
| 6,485,240 B2 * | 11/2002 | Stumpf et al. | 411/171 |
| 6,532,655 B1 * | 3/2003 | Ahn et al. | 29/888.042 |
| 6,979,160 B2 * | 12/2005 | Babej et al. | 411/179 |
| 7,047,617 B2 * | 5/2006 | Ladouceur | 29/432.1 |
| 7,080,438 B2 * | 7/2006 | Murakami | 29/428 |
| 7,367,487 B2 * | 5/2008 | Murakawa et al. | 228/112.1 |
| 7,661,575 B2 * | 2/2010 | Aota et al. | 228/112.1 |
| 2002/0166611 A1 * | 11/2002 | Sugiura et al. | 148/693 |
| 2002/0179682 A1 * | 12/2002 | Schilling et al. | 228/112.1 |
| 2007/0044901 A1 | 3/2007 | Chen et al. | |
| 2007/0240897 A1 * | 10/2007 | Gafri et al. | 174/94 R |
| 2007/0251979 A1 * | 11/2007 | Mauer | 228/2.3 |
| 2007/0258788 A1 * | 11/2007 | Gardstam | 411/176 |
| 2008/0067217 A1 * | 3/2008 | Pinzl et al. | 228/114.5 |
| 2008/0101857 A1 * | 5/2008 | Christ | 403/272 |
| 2008/0187408 A1 * | 8/2008 | Babej et al. | 411/181 |
| 2009/0324986 A1 * | 12/2009 | Kleber | 428/591 |
| 2011/0038687 A1 * | 2/2011 | Babej | 411/86 |
| 2011/0064581 A1 * | 3/2011 | Bassler et al. | 416/213 R |
| 2011/0073258 A1 * | 3/2011 | Christ et al. | 156/378 |

FOREIGN PATENT DOCUMENTS

| | | | |
|---|---|---|---|
| JP | 61-079622 A * | 4/1986 | |
| JP | 63-028634 A * | 2/1988 | |
| JP | 2002066760 | 3/2002 | |
| JP | 2002-256453 | 9/2002 | |
| JP | 2004-337935 | 12/2004 | |
| JP | 2006-043769 A * | 2/2006 | |
| JP | 2006289409 A | 10/2006 | |
| JP | 2011-067835 A * | 4/2011 | |
| SU | 1073046 A * | 2/1984 | |
| WO | WO-9111309 A2 * | 8/1991 | |
| WO | 2006016417 A1 | 2/2006 | |

OTHER PUBLICATIONS

Motohashi et al., A New Plastic Working Method for Magnesium Alloys by Means of Friction Stir Technology, Magnesium, 8$^{th}$ International Conference on Magnesium Alloys and their Applications, Jun. 2009, pp. 1038-1045.

Office Action in European Patent Application No. 09008573.9-2302 dated Nov. 12, 2009.

Translation, "Notice of Reason(s) for Rejection", Appeal No. 2013-19050, Patent App. No. 2008-183276, Jul. 7, 2014, 4 pages.

Translation, "Opinions", Appeal Trial No. 2013-19050, Patent App. No. 2008-183276, Sep. 19, 2014, 10 pages.

"Decision of Patent Registration", Appeal No. 2013-19050, Patent App. No. 2008-183276, Dec. 2, 2014, 2 pages.

* cited by examiner

FIG. 4
(a)
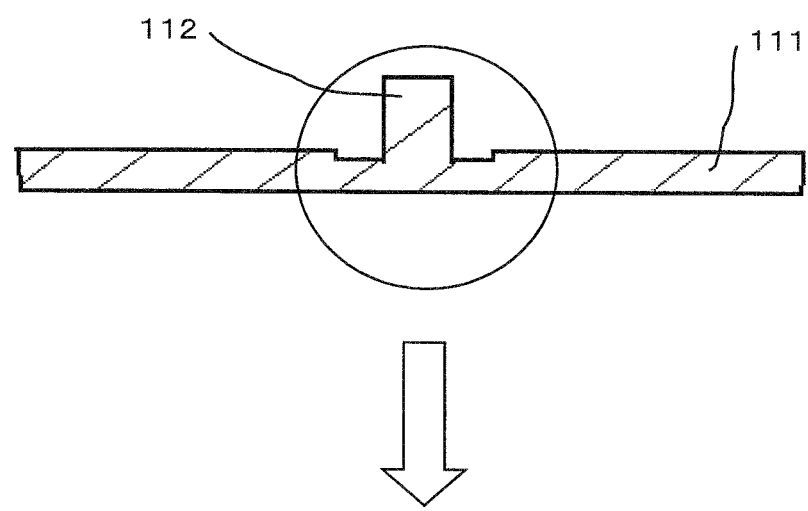
(b)
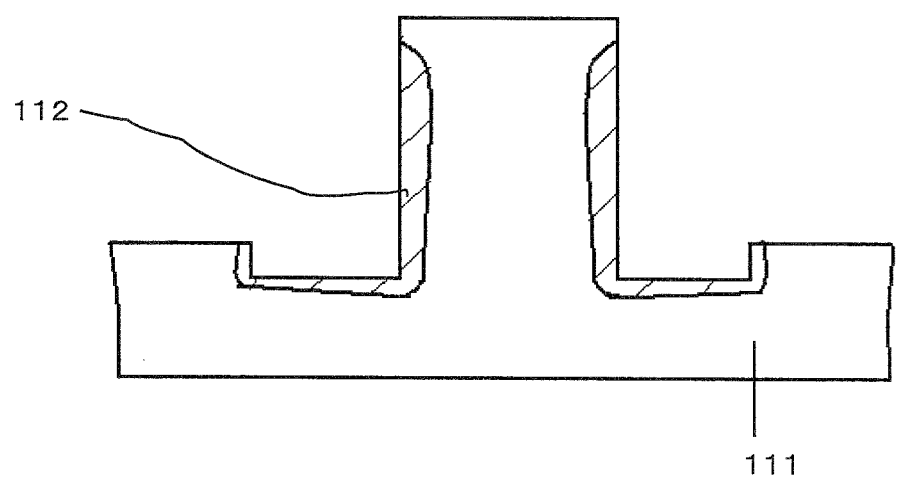

METHOD OF AND A DEVICE FOR FORMING A PROJECTION ON A METAL MEMBER AND A METAL PART PROCESSED BY THE METHOD OF FORMING A PROJECTION

BACKGROUND OF THE INVENTION

The present invention relates to a method of forming a projection (or projections) on a metal member by means of a new kind of the friction stir processing and a projection-forming device, wherein the projection is of the same material as the metal member; and relates to a metal part that is processed by the method of forming a projection.

A technique of forming a solid projection (a boss) on the surface of a metal member has been widely used as a means for positioning, supporting, fixing or securing, or cooling. The technique is now an indispensable technology in, such as, mobile information terminals like mobile telephones and mobile personal computers, home appliances, automotive parts, and railway cars. A known and currently in-use method of forming a solid projection on the surface of a metal member includes a method such that a projection-part provided in advance is welded, blazed, solid-phase welded, or friction bonded onto a metal member; and a method in which the metal member is pressed to form a projection using a die assembly. Both the techniques of welding and brazing have problems in that they are costly because they needs increased number of steps in processing and in that almost all of these techniques are not applicable to metals such as magnesium, magnesium alloys, aluminum, or aluminum alloys which have been increasingly used for weight reduction purpose of devices. There are another problems in that friction welding does not provide a good dimensional accuracy and in that pressing is not applicable to the cases where the metal member is small in size, thin in thickness, or complicated in structure.

A technique proposed as a method of forming a solid projection on the surface of a metal member is called as a friction stir forming method (Patent Literature 1). In the proposed method, a first object of an aluminum plate is placed on a second object having a recess (a die assembly); a frictional-heat-generation-stirring-means is abutted against the first object; a relative motion is given between them to generate frictional heat to cause the first object to flow plastically under non-molten state; and a shape of projection that corresponds to the recessed portion on the second object is copied on the first object (so-called "coining"). One of other methods proposed for the same purpose is defined in a method for manufacturing magnesium alloy parts (Patent Literature 2). In the method, a plate material is sandwiched between a pair of upper and lower molds and heated to cause a part of the plate material to flow plastically into a recess on the mold to form a projection. The former method, a friction stir forming method, can solve above-stated problems. This method does not need any heating sources, wherein the recess formed on the mold arranged opposite to the stirring means is filled by plastic flow caused by frictional heat. This (the former) method however involves a problem left unsolved in that projections formed with this method are poor in mechanical properties (strength and ductility) with a little practicality. This is because of the fact, according to an investigation by the inventors of the present invention, that the structure in the projection portion is not refined since the recess provided on the second object is positioned apart from such a region where the friction stirring given by the frictional heat generation stirring means on the first object makes the structure fine-grained. Further, it is difficult to form projections having diameters of 3 mm or more with heights of 5 mm or more on a thin plate (2 mm or thinner) with this method. The later method enables forming a projection on a magnesium alloy member that does not accept welding or brazing; the method can solve the above-stated problems. In this method, however, the upper mold and the lower mold severally have a built-in heater for heating the alloy to cause plastic flow. This means that the method has problems in that the thermal energy from outside is required, and besides, the mechanical properties of the projection are not improved. The reason for the poor properties is that a plastic flow occurs without stirring produces only a small strain energy which is insufficient to cause dynamic recrystallization, resulting in an inadequate grain refinement of the structure.

[Patent Literature 1]
Publication of Japanese Unexamined Patent Application, No. 2002-256453

[Patent Literature 2]
Publication of Japanese Unexamined Patent Application, No. 2004-337935

BRIEF SUMMARY OF THE INVENTION

An advantage of the present invention is to provide a method of forming a solid projection having excellent mechanical properties (strength and ductility) on a metal member without supplying thermal energy from the outside and to provide a projection-forming device. Another advantage of the present invention is to provide a method of forming a solid projection having excellent mechanical properties on a metal member to which welding or brazing is usually difficult to apply and to provide a projection-forming device. Further another advantage of the present invention is to provide a metal part having a solid projection with excellent mechanical properties.

A method of forming a solid projection on a metal member according to the present invention is characterized in that the method is comprised of the processes of: pressing the distal end of a processing means having a hole-opening and a cavity at the distal end against the surface of a metal member workpiece; and rotating the metal member workpiece and the processing means in the direction relatively counter to the other. Rotation of the processing means with being pressed against the metal member workpiece generates frictional heat. This frictional heat raises temperature of such a part of the metal member workpiece as abuts against the processing means causing plastic flow to occur under low stress. The metal member workpiece then flows into the cavity through the hole-opening provided at the distal end of the processing means to form a projection guided by a barrier effect appeared in the surrounding region where almost no plastic flow occur. The time length during which the occurrence of plastic flow lasts increases proportionally to the time length of the rotation and consequently the volume part of the metal member workpiece flowing plastically into the cavity through the hole-opening on the processing means also increases with increased height of the projection. Since the plastic flow occurs while the metal member workpiece is under solid state, the structure thereof does not coarsen. Further, since the projection and the surface region of the metal member workpiece near the projection are made to have a fine-grained structure by the friction stirring given by the processing means compared with other region, superplastic-like flow occurs at a high temperature state (frequently defined as the temperature not lower than ½ of the melting point of the metal member workpiece expressed in the absolute temperature) while processing with small deforming stress and very high plastic flows. Thereby, the mechanical strength of the projection can be enhanced, after returned to the room temperature on completion of processing. The frictional heat is generated by rotating the metal member workpiece and the processing means in the direction relatively counter to the other with them abutted against each other. Practicable methods for generating the heat include: rotating the processing means with the metal member workpiece kept stationary; rotating the metal member workpiece with the processing means kept stationary; and rotating the metal member workpiece and the processing means in the counter direction to the other, or in the same direction but with rotation speeds different form each other.

A metal member to which the method of forming a solid projection on the metal member by the present invention is applicable is not limited to magnesium alloys or aluminum alloys, however, applications to these are preferable. Such magnesium alloys include such a magnesium alloy as contains at least one of aluminum (Al), zinc (Zn), zirconium (Zr), manganese (Mn), lithium (Li), iron (Fe), silicon (Si), copper (Cu), nickel (Ni), calcium (Ca), and rare metals. Also such aluminum alloys include such an aluminum alloy as contains at least one of copper (Cu), manganese (Mn), silicon (Si), magnesium (Mg), zinc (Zn), nickel (Ni), chromium (Cr), and titanium (Ti).

A projection-forming device according to the present invention is characterized in that the device is comprised of: a holding means for holding a metal member workpiece; a processing means having a hole-opening and a cavity at its distal end; a means for rotating the processing means; a means for moving at least one of the holding means and the processing means along the line that connects both the holding means and the processing means; and a means for pressing the processing means against the surface of the metal member workpiece. This configuration enables forming a projection on a metal member workpiece by the plastic flow without supplying thermal energy from the outside, wherein the projection has the same material as the metal member workpiece. This processing device may be used as a single-function machine for forming a projection on a metal member or may be used as a processing section in a progressive press that includes plural processing steps.

Processing jigs for the projection-forming device by the present invention are required to have heat resistivity, abrasion resistivity, and low wettability (accepts no adhesives). Usable materials for the jigs are, for example: stainless steel (SUS), tool steel (carbon tool steel, or SK-steel, for example), super alloy (Ni-based, Fe-bases, and Co-based), ceramics (cubic boron nitride (CBCN), $ZrO_2$, SiC, $Si_3N_4$, SiALON, $Al_2O_3$, and composite material of these), and metal-ceramic composite (cermet for example).

A metal part having a projection by the present invention is characterized in that the metal part has a projection formed integrally on the surface of a metal member, wherein the material of the projection is the same as the material of the metal member; and the projection and the surface region of the metal member near the projection are made to have a fine-grained structure compared with other region. This metal part having a projection is suitable for the use in mobile information terminals, home appliances, automotive parts, and railway cars as their projection-having parts.

According to the method of forming a projection on a metal member by the present invention, the related volume part of the metal member is made flow into the cavity through the hole-opening on the processing means in the state of plastic flow caused by frictional heat; the projection is formed with the same material as the metal member; the surface region of the projection is made to have a fine-grained structure; and, thereby, a solid projection having excellent mechanical properties is provided. The processing device by the present invention provides a means for actualizing a method of forming a projection on a metal member of the present invention. The device enables forming a projection on a metal member workpiece by the plastic flow without supplying thermal energy from the outside, wherein the projection has the same material as the metal member workpiece. Further, the metal part having a projection by the present invention enables actualizing a projection having excellent mechanical properties, because the projection and the surface region of the metal member near the projection are made to have a fine-grained structure compared with other region.

BRIEF DESCRIPTION OF THE DRAWINGS

FIG. 4 is a schematic cross sectional diagram to explain that the projection formed on a metal member by the method defined in the present invention has enhanced mechanical properties.

DETAILED DESCRIPTION OF THE INVENTION

The best mode of implementing the method of forming a solid projection on a metal member by the present invention is the embodiment such that the metal member workpiece is magnesium alloy and the projection is formed on the alloy thereof by the frictional heat using a processing jig made of stainless steel. Magnesium and magnesium-based alloys are lightweight metals and are on a trend of wide-use in metal parts for mobile information terminals, home appliances, automotive parts, and railway cars. These alloys, however, include problems of being incompatible with welding or brazing with matters left to be solved for the spread of use. The present invention solves these problems.

Embodiment 1

Figure 1:
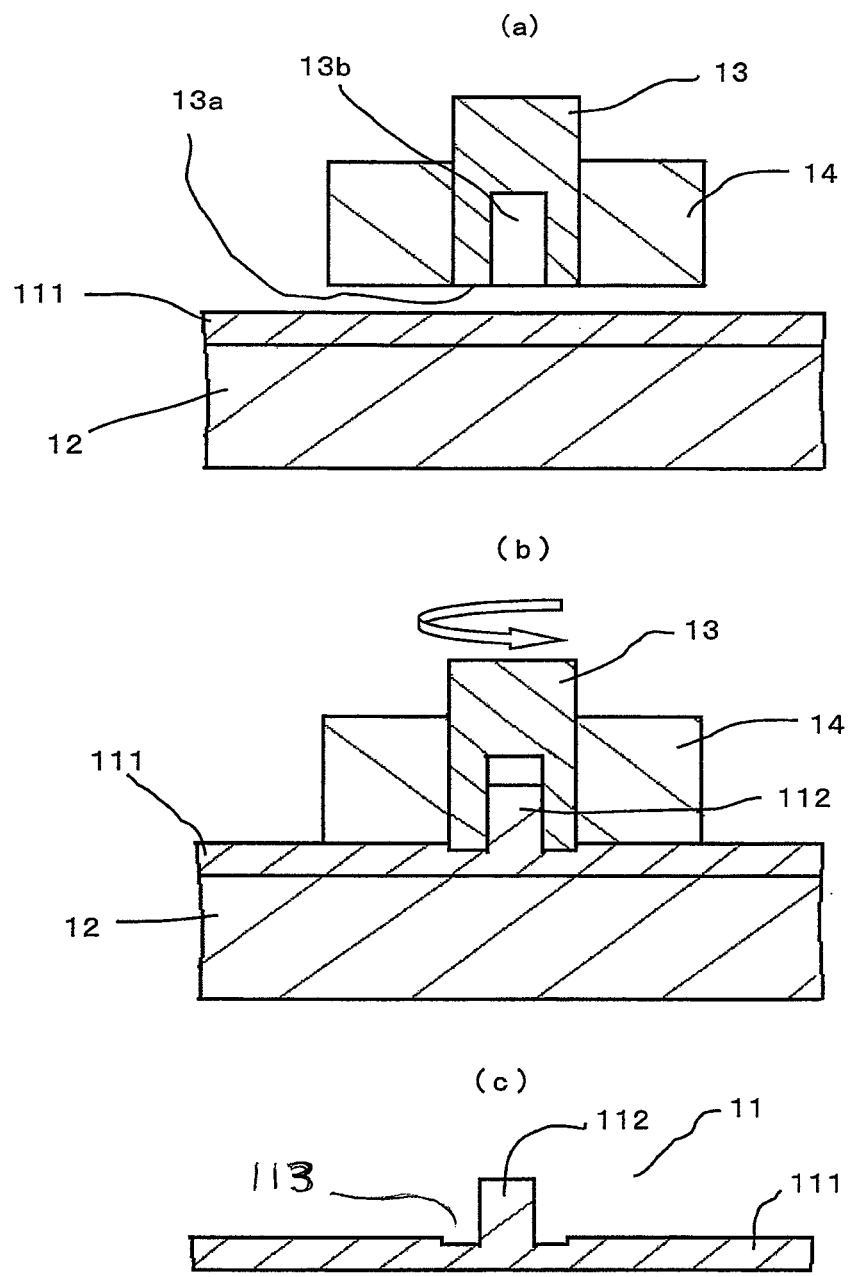
FIG. 1 is a schematic cross sectional diagram to explain a method of forming a projection on a metal member according to the present invention.
Figure 2:
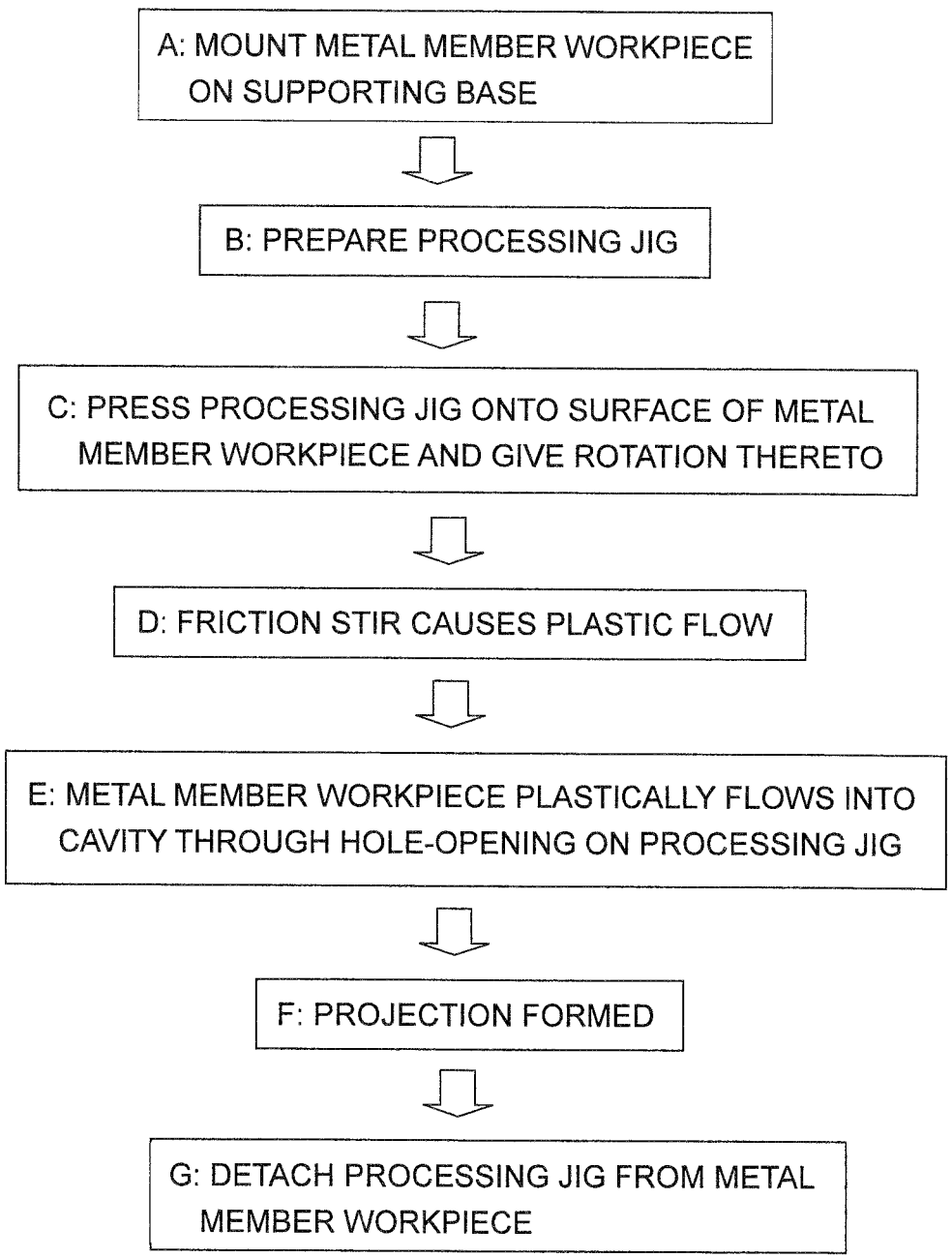
FIG. 2 is a block diagram to explain processes in a method of forming a projection on a metal member according to the present invention.

FIG. 1 and FIG. 2 are schematic diagrams of processing to illustrate the method of forming a projection on a metal member in an embodiment of the present invention. In FIG. 1, numeral 111 denotes a metal member workpiece on which a projection is to be formed; numeral 12 a processing table on which the metal member workpiece 111 is mounted and fixed; numeral 13 a processing jig having a hole-opening 13b at its distal end 13a, wherein the external shape of the jig 13 is such that the cross section thereof is circular; and numeral 14 a holding jig that holds the processing jig 13. The processing jig 13 is rotated by a rotary drive source and has a means for pressing in the direction of the distal end 13a with a predetermined thrust velocity and pressure. Forming the projection on the metal member workpiece 111 is as follows: The metal member workpiece 111 is placed on the processing table 12 at the predetermined position and fixed thereon mechanically or electro-statistically or by vacuum (FIG. 2, Process A). The processing jig 13 having the hole-opening 13b, of which dimension meets the size of the projection to be formed, is mounted on the holding jig 14 (FIG. 2, Process B) as illustrated in FIG. 1(a). The processing jig 13 is rotated and the distal end 13a is pressed against the surface of the metal member workpiece 111 with a predetermined thrust velocity and pressure (FIG. 2, Process C) as illustrated in FIG. 1(b). Pressing the distal end 13a of the processing jig 13 with rotation against the metal member workpiece 111 makes the temperature of the material in the surface region of the metal member workpiece 111 where the distal end 13a of the processing jig 13 abuts rise by the frictional heat causing the metal member workpiece to be softened. Thereby, the metal member workpiece is stirred by the rotation of the processing jig under the abutting pressure and then changes to a severe plastic deformation (SPD) state to have the fine-grained structure through such as dynamic recrystallization. The structure thus made fine-grained exhibits occurrence of a superplastic-like phenomenon, which causes plastic deformation easily to take place at high temperatures. The occurrence of the superplastic-like phenomenon causes plastic flow and further causes the softening of an un-refined region to plastically flow at high temperatures (FIG. 2, Process D). As will be discussed later, the plastic flow goes into the hole-opening 13b of the processing jig 13 (FIG. 2, Process E), filling to the position higher than the surface of the metal member workpiece 111 as illustrated in FIG. 1 (b) to form a projection 112 (FIG. 2, process F). Thereafter, the processing jig 13 is detached from the surface of the metal member workpiece 111 (FIG. 2, Process G). Thereby, a metal part 11 that has the solid projection 112 and a surrounding annular depression 113 due to the rotational processing is formed from the surface of the metal member 111 as illustrated in FIG. 1(c).

Figure 3:
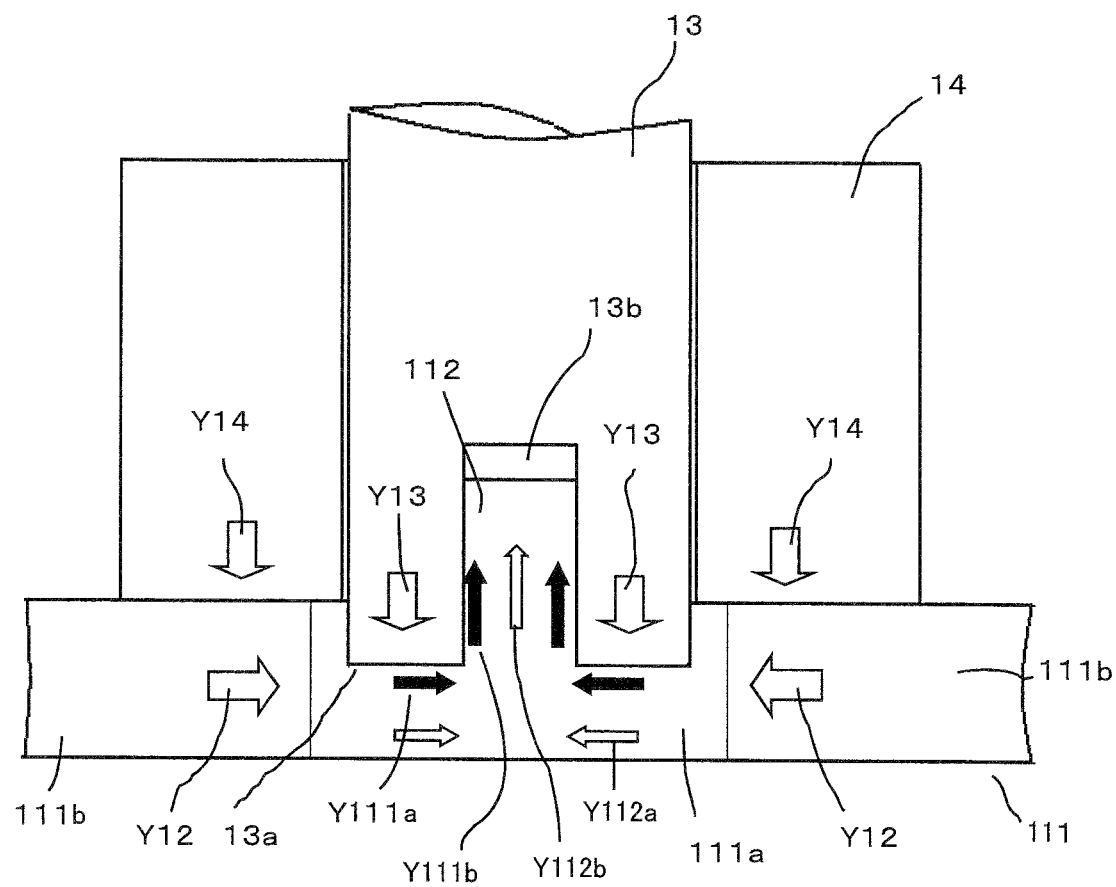
FIG. 3 is an enlarged schematic diagram to explain the working of a method of forming a projection on a metal member according to the present invention.

The reason how the plastic flow forms the projection is described below referring to FIG. 3, which is an enlarged schematic diagram of FIG. 1(b). The diagram illustrates such a state that a surface region 111a of the metal member workpiece 111 abutting against the distal end 13a of the processing jig 13 exhibits occurrence of superplastic-like phenomenon causing plastic flow in the direction shown with black arrows. In contrast, the lower region where no stirring occurs is softened by temperature rise caused from frictional heat and the pressure generated by the processing jig 13 produces plastic flow in the direction shown with white arrows (this behavior is close to a hot processing under ordinary conditions). In the surface region 111a of the metal member workpiece 111 that is exhibiting superplastic-like phenomena, the lateral area thereof is pressed in the direction of Y12 by a surrounding region 111b that envelopes the lateral area exhibiting no superplastic-like phenomenon; and the upper area thereof is pressed in the directions of arrows Y13 and Y14 by the distal end 13a of the processing jig 13 and the holding jig 14 causing pressing in the directions of the black arrow Y111a and the white arrow Y112a; thereby the direction of the hole-opening 13b of the processing jig 13 indicated by the black arrow Y111a,Y111b and the white arrow Y112b are left as the main flow direction. The flow into the hole-opening 13b continues in proportion to the time length during which the friction stirring by the processing jig 13 goes on with increased height of the projection 112.

Forming a projection on the surface of a metal member by plastic flow incurs a concave, so-called a shrinkage recede, appeared in the backside of the projection; the degree of this shrinkage recede increases with the projection height. Occurrence of the shrinkage can be prevented by giving the processing jig 13 a circular or linear movement on a plane parallel to the surface of the metal member. In almost all the cases, the surface of the metal member on which the projection is to be formed is such a face as will not be visibly exposed to the outside in the finished product and a face opposite to the surface where the projection is to be formed is such a face as externally appears in the finished product. Therefore, appearing the shrinkage recede is a bad situation in that the external face does not conform to the designed flatness or in that the appearance is not commercially fine.

An important matter in forming a projection on a metal member according to the present invention is how to determine the processing conditions. When processing the metal member workpiece of magnesium, magnesium-based alloys, aluminum, or aluminum-based alloys at a room temperature, the rotating speed of the processing jig will be 200 to 20000 rpm, preferably 500 to 5000 rpm and the press-in pressure is preferred to be 50 kg/cm$^2$ or larger under a predetermined thrust velocity of the processing jig.

Hereunder provided is an explanation for the excellence in the mechanical properties of the projection formed on a metal member by the method defined in the present invention. The region in the metal member workpiece 111 friction stirred by the processing jig 13 is refined considerably (occurrence such as dynamic recrystallization). The fine-grained region easily deforms at high temperatures and exhibits superplastic-like phenomenon causing plastic flow that goes into the cavity of through the hole-opening 13b on the processing jig 13 to form the projection 112. The projection 112 and the shaded area in its vicinity illustrated in FIG. 4(b) are such regions as have the fine-grained structure by the friction stirring. In general, the grain refinement of structure provides enhanced mechanical properties. In forming a projection on a metal member, concentration of stress occurs at the joining portion between the metal member and the projection frequently causing mechanical breakage at such point. Forming a projection by the invented method can provide improved mechanical strength, because the fine-grained structure comes to exist in the area covering the projection and the base portion between the projection and the metal member, reaching a portion in the metal member beyond the base portion.

Figure 5:
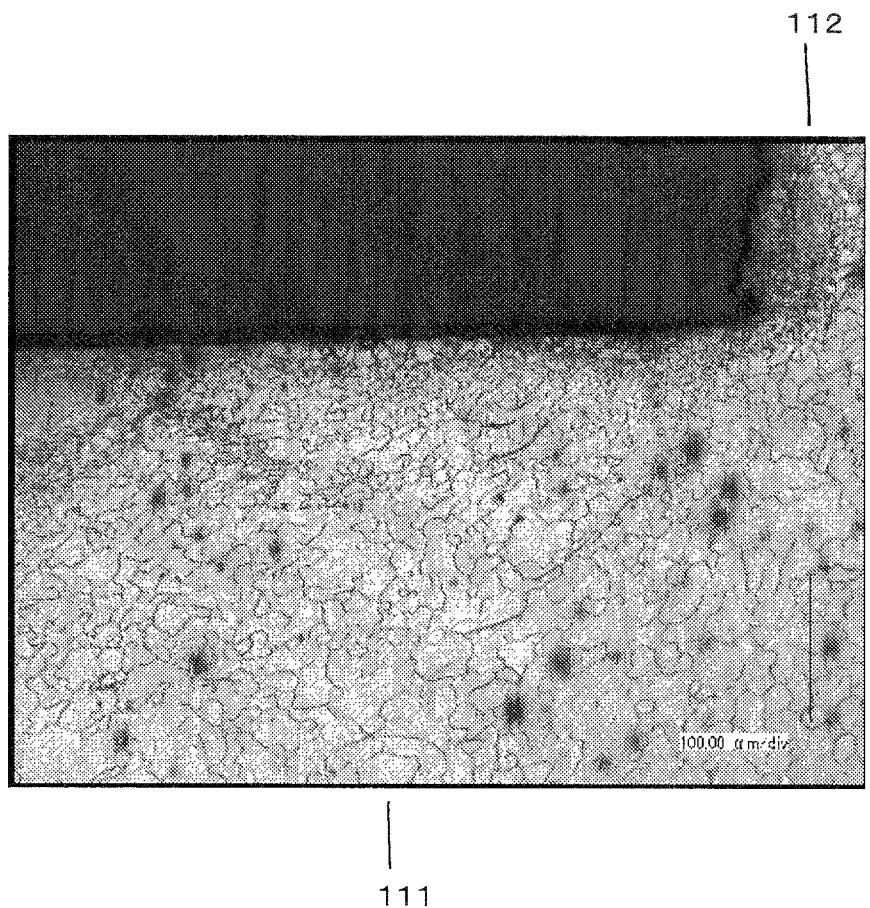
FIG. 5 is a microphotograph to show the state of the structure of the base portion and its neighboring region of the projection formed on the metal member by the method defined in the present invention.

FIG. 5 is a microphotograph to show the state of the structure of the proximal portion (the base portion between the metal member workpiece 111 and the projection 112 shown in FIG. 4) of the projection formed on the metal member by the method defined in the present invention. The photograph tells that the structure of such regions as correspond to the shaded area in FIG. 4(b) are made refined grains compared with other region.

Figure 6:
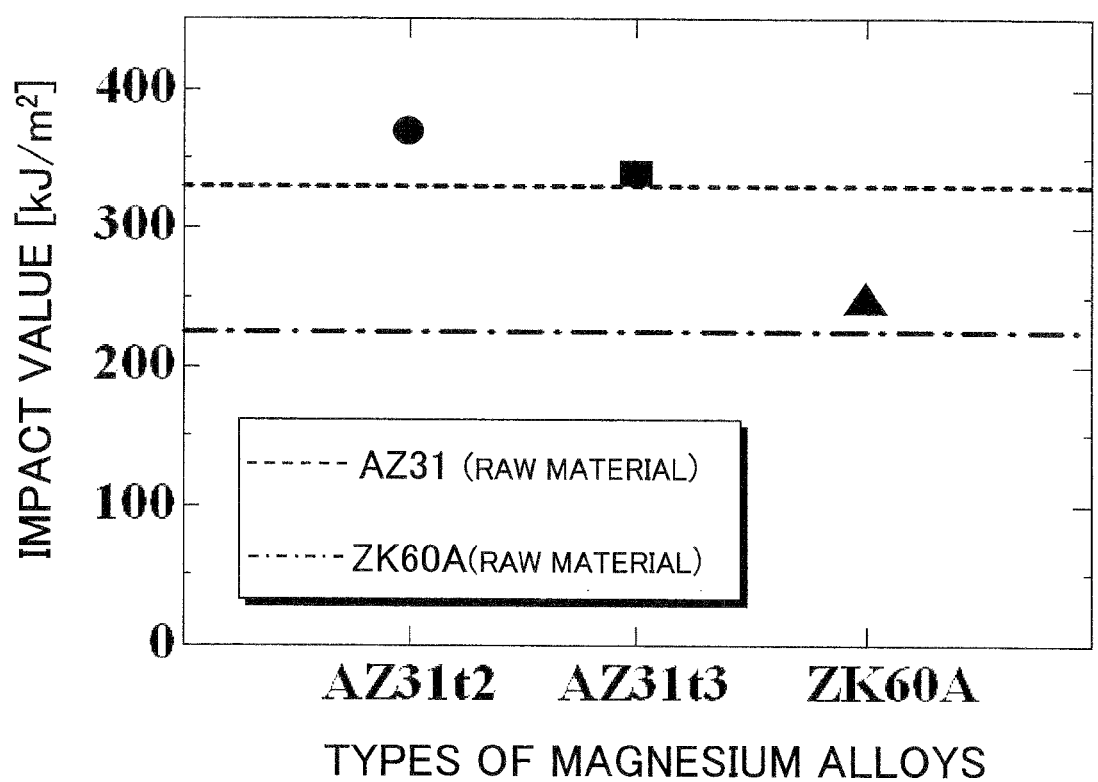
FIG. 6 shows measurements of impact value (strength), which is a mechanical property, of the projection formed on the metal member by the method defined in the present invention.

FIG. 6 shows measurements of the impact value (strength), which is a mechanical property, of the projection formed by the method defined in the present invention. The measuring was conducted on three magnesium alloys of the projections formed under the same conditions at the room temperature (20° C.), using an Izod impact tester (WR=3 kg-m), Tester Sangyo Co., Ltd. Vertical axis in the figure represents impact values (strengths) and horizontal axis type of magnesium alloys. The dotted line and the dot-dash line in the figure respectively indicate impact values of raw materials AZ31 and ZK60A. The test pieces were prepared using plates of AZ31 having a thickness of 2 mm (AZ31t2) and a thickness of 3 mm (AZ31t3), and a plate of ZK60A having a thickness of 3.1 mm; and then projections each having a diameter of 3 mm with a height of about 4 mm were formed thereon by the invented method. As can be known from FIG. 6, all the impact values of the projections formed by the invented method were larger than those impact values of their raw materials. This is ascribable to the fact that the surface of the area covering the projection and the base portion between the projection and the metal member, reaching a portion in the metal member beyond the base portion, was made to have a fine-grained structure.

Embodiment 2

Figure 7:
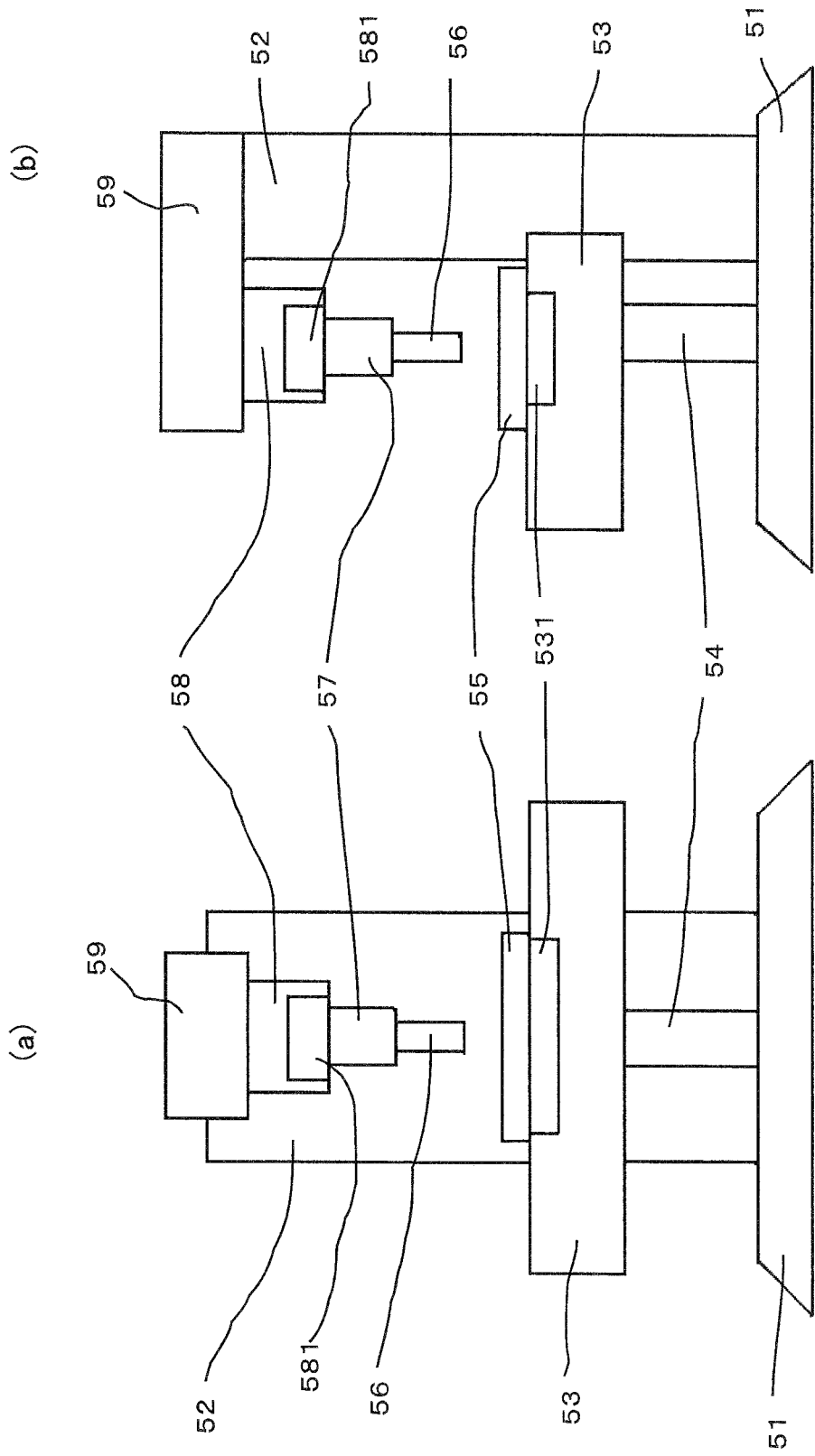
FIG. 7 is schematic front and side views of an example of the projection-forming device to be used for implementing the method of forming a projection on a metal member according to the present invention.

FIG. 7 is schematic front and side views of an example of the projection-forming device to be used for implementing the method of forming a projection on a metal member according to the present invention. In the figure, numeral 51 denotes a base on which the device is mounted; numeral 52 a frame secured on the base 51; numeral 53 a work-holding head retained on the frame 52 movably in the XY-directions on the horizontal plane; numeral 531 a temperature and pressure sensor embedded near the surface of the work-holding head 53; and numeral 54 a driving shaft driven by a driving motor, not illustrated, to move the work-holding head 53 vertically.

Numeral 55 denotes a work holder supported on the work-holding head 53; numeral 56 a rotary tool comprised of the processing jig 13 and the holding jig 14; numeral 57 a tool holder that holds the rotary tool 56; numeral 58 a tool holder driving motor that retains the tool holder 57 and moves the tool holder 57 in the vertical direction; numeral 581 a constant velocity and low load control unit retained on the tool holder driving motor; and numeral 59 a tool rotating motor to drive the rotary tool 56, supported on the frame 52 retaining the tool holder driving motor 58. The rotary tool 56 may be composed only of the processing jig 13 illustrated in FIG. 1.

In forming a projection on a metal member using the projection-forming device of this style of configuration, the metal member is mounted and fixed on the work holder 55 and then the projection-forming position on the metal member is made face to the rotary tool 56 moving the work-holding head 53 in the XY-directions. Thereafter, the tool holder 57 is moved downward by the tool holder driving motor 58 with the rotary tool 56 rotated by the tool rotating motor 59 to make the rotary tool 56 contact with the surface of the metal member and thrust into it at a predetermined thrust velocity and pressure of the rotary tool. Thereby, plastic flow is caused on the metal member by the frictional heat to form the projection. On completion of the projection-forming, the tool holder 57 is moved upward by the tool holder driving motor 58 to detach the rotary tool 56 from the metal member and the projection, and then the tool rotating motor 59 is stopped to terminate the working of the rotary tool 56.

As a method of control for making the rotary tool 56 contact with the surface of the metal member at a predetermined pressure, a pressure control and a position control are usable technique. The pressure and position control of the rotary tool have an advantage in that a boss height can be controlled with constancy. To detail, this system is actualized by mounting a strain gauge and a load-cell on the stage and the rotary shaft. However, variation of the applying-load may occur while forming the boss because of the heat, requiring a measure against this. The position control can be actualized by the use of a servomotor control for the stage and the rotary shaft with the advantage in that the control is relatively easy. The system however has a disadvantage in that the boss will have lower dimensional accuracy (accuracy of height) if the thickness of the workpiece prepared is not uniform. It may be a solution for this to make a positional adjustment on every boss forming with a continuous thickness control by the use of a laser displacement meter.

Embodiment 3

Figure 8:
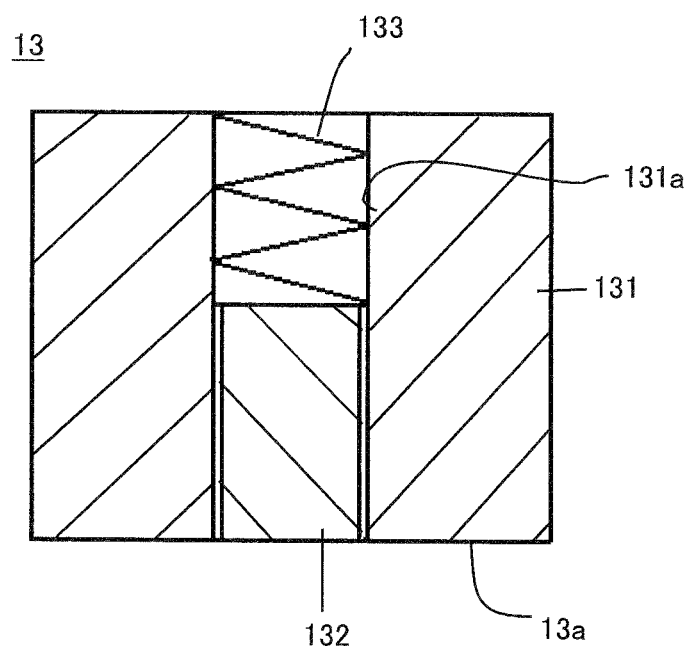
FIG. 8 is a schematic cross sectional diagram to illustrate a modification example of the processing jig to be used for implementing the method of forming a projection in a metal member according to the present invention.

FIG. 8 is a schematic cross sectional diagram to show a modification example of the processing jig. In this embodiment, the processing jig 13 illustrated in FIG. 1 is comprised of: a cylindrical member 131 having a hole 131a that corresponds to the hole-opening 13b, a pressure member 132 being inserted in the hole 131a on the cylindrical member 131, and a spring 133 to press the pressure member 132 toward the distal end 13a of the cylindrical member 131 guided by the hole 131a of the cylindrical member 131. The configuration of the processing jig 13 in this manner offers effects of:

(1) an air escape is provided while forming the projection since a small gap is formed between the hole 131a of the cylindrical member 131 and the pressure member 132, and (2) a projection having a flat-shaped distal end can be formed because the distal end of the projection is pressed during forming the projection.

Embodiment 4

Figure 9:
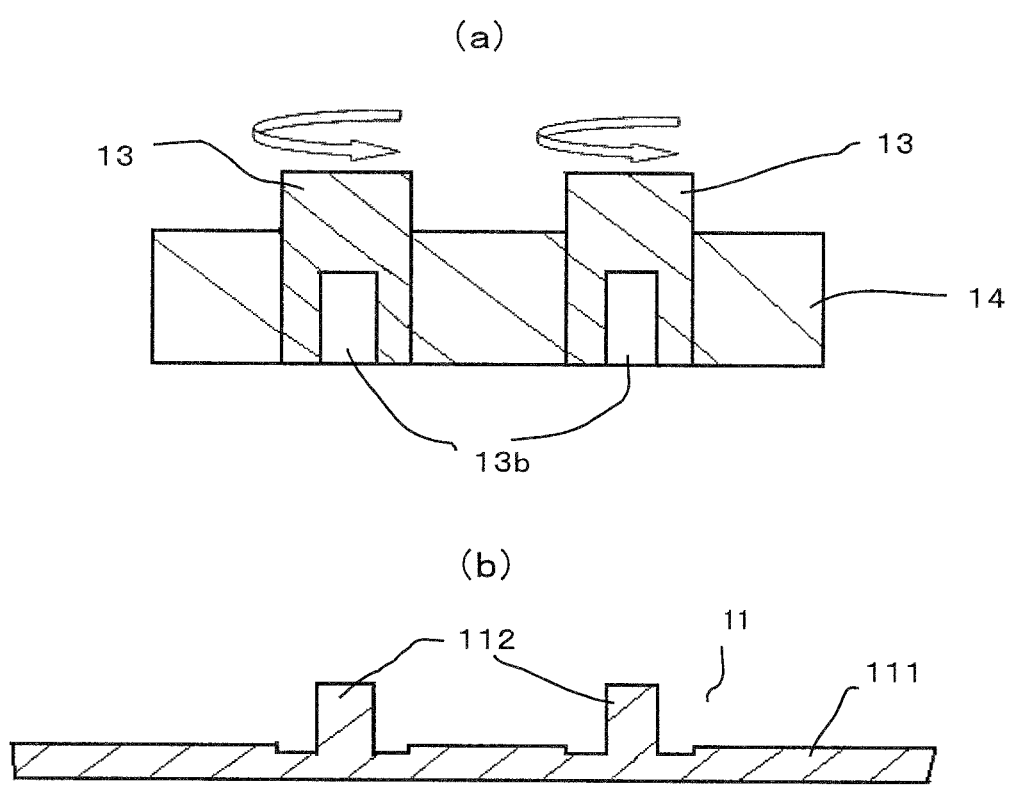
FIG. 9 is a schematic cross sectional diagram of the processing jig to be used in forming two projections and is a cross sectional diagram of the metal part having two projections formed using the jig.

FIG. 9 is a schematic cross sectional diagram of the processing jig 13 to be used in forming two projections at a time and is a cross sectional diagram of the metal part 11 having two projections formed using the jig. This configuration is such that two processing jigs are installed side-by-side on the holding jig 14 illustrated in FIG. 1. The processing jig 13 is such a processing jig as is suitable for forming closely placed projections 112 and has an advantage in that the processing time is reduced to ½. The explanation of this embodiment has been provided taking the case of forming two projections 112 as an example, embodiments however should not be limited to two projections; the number of the processing jig 13 can be increased according to the desired number of the adjoining projections. In a preferable embodiment style, an adjusting means capable of optionally varying the distance between projections would be provided.

Embodiment 5

Figure 10:
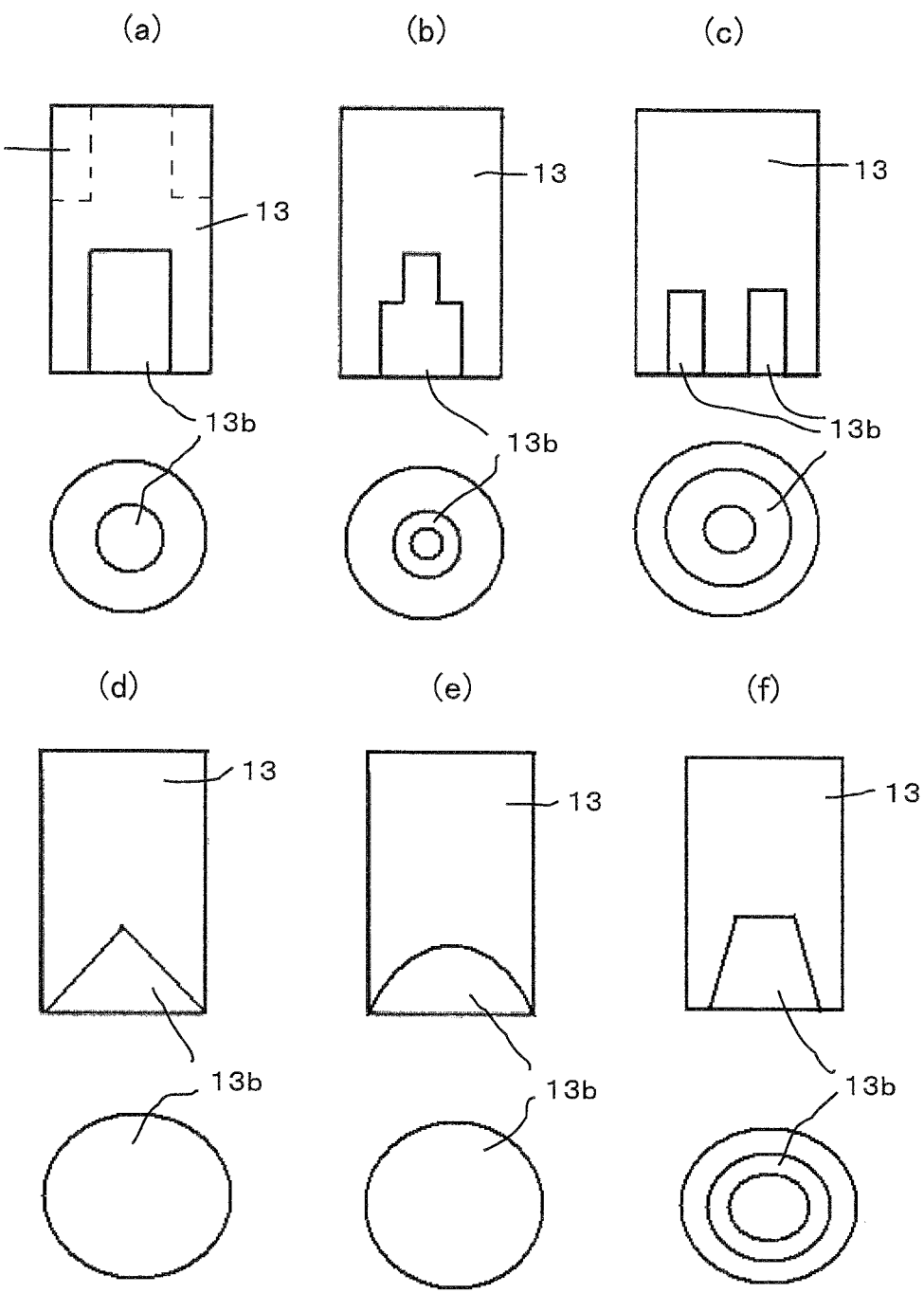
FIG. 10 is a schematic diagram of front views and bottom views of typical constructions of the processing jigs used in the method of and the device for forming a different shape projection on a metal member according to the present invention.

FIG. 10 is a schematic diagram of front views and bottom views of typical constructions of the processing jig 13 used in the method of and the device for forming a projection having different shapes and sizes on a metal member according to the present invention. Part (a) of the figure illustrates the processing jig 13 used in forming one projection having a cylindrical shape, wherein one hole-opening 13b is formed. The portion indicated with dotted line in the upper portion of the processing jig 13 may be cut to make the upper portion thin. This modification is applicable to those processing jigs indicated below. Part (b) of the figure illustrates the processing jig 13 used in an example of modified application of forming one columnar projection, wherein one hole-opening 13b is formed to have such a composite shape that a small diameter column is combined on a large diameter column. Part (c) of the figure illustrates the processing jig 13 used in forming one columnar projection with a ring-like shaped protrusion, wherein the hole-opening 13b is formed to have a ring-like shape. Part (d) of the figure illustrates the processing jig 13 used in forming a conic projection, wherein the hole-opening 13b is formed to have a conical shape. Part (e) of the figure illustrates the processing jig 13 used in forming one hemispherical projection, wherein the hole-opening 13b is formed to have a hemispherical shape. Part (f) of the figure illustrates the processing jig 13 used in forming a circular truncated cone projection. The processing jigs 13 in these styles are applicable with other manner of modifications or in various combinations and the present invention does not limit the jig to these processing jigs.

A method of and a device for forming a projection on a metal member and a metal part manufactured thereby are not limited to those methods or configurations explained in the embodiments, and various modification can be practiced within the scope of the technical idea of the present invention.

What is claimed is:

1. A method of forming a solid columnar projection of a metal member comprising the processes of:
   providing a processing jig having a cavity and a hole-opening at its distal end opening to said cavity, of which dimensions meet the size of said solid columnar projection to be formed;
   pressing said distal end of said processing jig against a substantially planar original surface of a metal member workpiece with said processing jig and said metal member workpiece in relative rotation with respect to each other to insert said distal end of said processing jig into said metal member workpiece while said metal member workpiece is being directly supported by a processing table, causing a plastic flow of metal of said original surface of said metal member workpiece into the cavity of said processing jig through the hole-opening without the processing table being bonded to the workpiece by the pressing;
   continuing the relative rotation further until the cavity is filled with said plastic flow of the metal to a position higher than the original surface of said metal member workpiece; and
   withdrawing said processing jig from the metal member workpiece with metal of the original surface risen and remaining in said solid columnar projection projected from the original surface of the metal member workpiece.

2. The method of forming a solid columnar projection of a metal member according to claim 1, wherein said metal of said metal member workpiece is a metal selected from the group consisting of magnesium, magnesium alloy, aluminum and aluminum alloy.

3. The method of forming a solid columnar projection of a metal member according to claim 1, wherein said plastic flow of said metal of said metal member workpiece flows away from the surface of initial contact of the metal member workpiece with the distal end of the processing jig in said pressing, filling the cavity to a position projected from said surface of initial contact.

4. The method of forming a solid columnar projection of a metal member according to claim 1, wherein the force of said pressing applied to the original surface of the metal member workpiece and the relative rotational speed between the processing jig and the metal member workpiece are determined so as to cause the plastic flow of the metal of the metal member workpiece.

5. A method of forming a metal-structure-maintained solid columnar projection on a metal member workpiece, which is mounted fixedly on a processing table, by pressing a part of said metal member workpiece with a processing jig held on a holding jig using a plastic flow forming method as maintains the metal structure of said metal member workpiece,
   wherein, at least in part, said processing jig has a circular external shape in its cross section, a hole-opening is formed inside said processing jig opening toward a working end thereof, and a cross-sectionally ring-shaped portion is formed on a working face of the working end of said processing jig;
   wherein said processing jig is so configured as to form said solid columnar projection on said metal member workpiece by pressing the working face to a part of said metal member workpiece to insert said working face of said processing jig into said metal member workpiece while said metal member workpiece is being directly supported by said processing table, causing said metal member workpiece to flow plastically while maintaining its metal structure without the processing table being bonded to the workpiece by the pressing;
   wherein said processing jig has a rotary drive source and a pressing pressure controller;
   wherein, under the pressing pressure applied by said holding jig, said processing jig applies a pressing pressure against said metal member workpiece to cause a metal-structure-maintained portion of and a fine-grained portion of said metal member workpiece to be thrust toward said hole-opening;
   wherein said processing jig is operated with a rotary drive controller so that the rotary drive source rotates with a rotating speed in a range from 500 to 5000 rpm, with the pressure controller so that the pressing pressure is 50 kg/cm$^2$ or more, and with a position controller to position the processing jig in the forming of said solid columnar projection on said metal member workpiece and for regulating the plate-thicknesswise position of the work face of said processing jig in said metal member workpiece in order that, when the working face makes pressure-contact with the contact surface of said metal member workpiece, the inside portion of said metal member workpiece in the lower area of the pressure-contacted surface region of said metal member workpiece will not have occurrence of frictional stirring, putting said portion in a plastically flowable state with the metal structure thereof maintained,
   wherein said processing jig stirs said surface region by the rotation friction, such that the metal structure of said surface region of said metal member workpiece undergoes the friction stir processing for fine-graining and softening, and such that said surface region portion of said metal member workpiece having the fine-grained and softened metal structure is made to be plastically flowable to form a one-body configuration integral with said metal member workpiece that is processed into the plastically flowable state with the metal structure maintained;

wherein said processing jig applies a pressing pressure sufficient for said working face to be inserted into said metal member workpiece so that at least a portion of said metal member workpiece will flow plastically toward the hole-opening to fill the inside thereof in a composition such that the inner portion of said plastic flow of said metal member workpiece maintains its metal structure and the surface portion of said plastic flow is said surface region portion of said metal member workpiece having fine-grained and softened metal structure;

such that the solid columnar projection is formed with an elevated height higher than the surface level of said metal member workpiece before the pressing, wherein the inner portion of said solid columnar projection has a composition that maintains the metal structure of said metal member workpiece and the surface portion of said solid columnar projection has a composition that has the surface region of said fine-grained and softened portion of said metal member workpiece.

6. A method of forming a metal-structure-maintained solid columnar projection on a metal member workpiece, which is mounted fixedly on a processing table, by pressing a part of said metal member workpiece with a processing jig held on a holding jig using such a plastic flow forming method as maintains the metal structure of said metal member workpiece, wherein, at least in part, said processing jig has a circular external shape in its cross section, a hole-opening is formed inside said processing jig opening toward a working end thereof, and a cross-sectionally ring-shaped portion is formed on a working face on the working end of said processing jig;

wherein said processing jig is so configured as to form said solid columnar projection on said metal member workpiece by pressing the working face to a part of said metal member workpiece to insert said working face of said processing jig into said metal member workpiece while said metal member workpiece is being directly supported by said processing table, causing said metal member workpiece to flow plastically while maintaining its metal structure without the processing table being bonded to the workpiece by the pressing;

wherein said processing jig has a rotary drive source and a pressing pressure controller;

wherein, under the pressing pressure applied by said holding jig, said processing jig applies a pressing pressure against said metal member workpiece to cause a metal-structure-maintained portion of and a fine-grained portion of said metal member workpiece to be thrust toward said hole-opening;

wherein said processing jig is operated with a rotary drive controller so that the rotary drive source rotates with a rotating speed in a range from 200 to 20000 rpm, with the pressure controller so that the pressing pressure is 50 kg/cm$^2$ or more, and with a position controller to position the processing jig in the forming of said solid columnar projection on said metal member workpiece and for regulating the plate-thicknesswise position of the work face of said processing jig in said metal member workpiece in order that, when said working face makes pressure-contact with the contact surface of said metal member workpiece, the inside portion of said metal member workpiece in the lower area of the pressure-contacted surface region of said metal member workpiece will not have occurrence of frictional stirring, putting said portion in a plastically flowable with the metal structure thereof maintained, wherein said processing jig stirs said surface region by the rotation friction, such that the metal structure of said surface region of said metal member workpiece undergoes the friction stir processing for fine-graining and softening, and such that said surface region portion of said metal member workpiece having the fine-grained and softened metal structure is made to be plastically flowable to form a one-body configuration integral with said metal member workpiece that is processed into the plastically flowable state with the metal structure maintained;

wherein said processing jig applies a pressing pressure sufficient for said working face to be inserted into said metal member workpiece so that at least a portion of said metal member workpiece will flow plastically toward the hole-opening to fill the inside thereof in a composition such that the inner portion of said plastic flow of said metal member workpiece maintains its metal structure and the surface portion of said plastic flow is said surface region portion of said metal member workpiece having fine-grained and softened metal structure;

such that the solid columnar projection is formed with an elevated height higher than the surface level of said metal member workpiece before the pressing, wherein the inner portion of said solid columnar projection has a composition that maintains the metal structure of said metal member workpiece and the surface portion of said solid columnar projection has a composition that has the surface region of said fine-grained and softened portion of said metal member workpiece.

* * * * *